United States Patent [19]

MacCracken et al.

[11] Patent Number: 4,954,278
[45] Date of Patent: Sep. 4, 1990

[54] EUTECTIC COMPOSITION FOR COOLNESS STORAGE

[75] Inventors: Calvin D. MacCracken, Englewood, N.J.; Maria Telkes, North Miami, Fla.

[73] Assignee: Calmac Manufacturing Corp., Englewood, N.J.

[21] Appl. No.: 348,965

[22] Filed: May 8, 1989

[51] Int. Cl.⁵ .............................................. C09K 5/06
[52] U.S. Cl. ........................................ 252/70; 165/10
[58] Field of Search ............................ 252/70; 165/10

[56] References Cited

U.S. PATENT DOCUMENTS

| | | | |
|---|---|---|---|
| 2,677,664 | 5/1954 | Telkes | 252/70 |
| 3,986,969 | 10/1976 | Telkes | 252/70 |
| 4,231,885 | 11/1980 | Rueffel | 165/10 |
| 4,288,338 | 9/1981 | Phillips | 252/70 |

Primary Examiner—Paul Lieberman
Assistant Examiner—Christine A. Skane
Attorney, Agent, or Firm—Charles J. Brown

[57] ABSTRACT

A eutectic composition for coolness storage and its method of making wherein a dry particulate mixture of sodium sulfate and a lesser amount of sodium tetraborate pentahydrate is added to water while the water is stirred, together with a small amount of a buffering acid to reduce alkalinity.

10 Claims, 1 Drawing Sheet

EUTECTIC COMPOSITION FOR COOLNESS STORAGE

BACKGROUND OF THE INVENTION

This invention concerns a phase change material which melts and freezes at a temperature below 32 degrees F. and can be utilized to store coolness in ice bank equipment such as that disclosed in co-applicant Calvin MacCracken's U.S. Pat. Nos. 4,294,078 and 4,403,645. In particular it relates to an improved eutectic composition, and its method of use, having a melting-freezing temperature remaining constant at about 28 degrees F. providing optimum neuclation and minimal precipitation during freezing.

Co-applicant Maria Telkes in her U.S. Pat. Nos. 2,667,664 and 2,989,856 disclosed a phase change material rich in anhydrous sodium sulfate (at least one-third by weight) with a small amount of sodium tetraborate decahydrate (i.e. borax) as a neuclating agent, both added to water. That composition was intended for heat storage rather than coolness storage and had a melting-freezing temperature of about 90 degrees F. The salt was not in the solubility range in water so that a substantial amount of it precipitated upon melting unless a strong gel or thixotropic agent was employed, as described in Telkes' U.S. Pat. No. 3,986,969. The heat of fusion of the Telkes' prior art eutectic was in the order of 103 Btu's per pound and its volumetric storage capacity was approximately 7280 Btu's per cubic foot. Another eutectic of anhydrous sodium sulfate decahydrate mixed with chlorides or potassium nitrate having melting-freezing temperatures above 40 degrees F. for coolness storage is disclosed in Telkes' U.S. Pat. No. 2,989,856.

The object of the present invention is to provide a eutectic composition for coolness storage in ice bank equipment such as that described in the aforementioned MacCracken patent. The eutectic is to have a constant melting-freezing temperature of about 28 degrees F, a heat of fusion substantially higher than that of the prior art, improved solubility in water to reduce precipitation, and optimum nucleation during freezing.

SUMMARY OF THE INVENTION

The invention provides a eutectic composition consisting essentially of approximately 3.3% to approximately 4.3% by weight of sodium sulfate, approximately 0.5% to approximately 1.5% by weight of sodium tetraborate decahydrate, and the balance water. A buffering acid may be included to reduce alkalinity, and sodium bisulfate is preferred for that purpose comprising approximately 0.3% to approximately 0.9% by weight of the composition.

In a preferred form of the eutectic of the invention the sodium sulfate is approximately 3.8% by weight and the sodium tetraborate decahydrate is approximately 1.0% by weight of the composition.

The invention also covers a dry particulate mixture consisting essentially of approximately 65% to approximately 90% by weight of anhydrous sodium sulfate, approximately 10% to approximately 25% by weight sodium tetraborate pentahydrate, and approximately 6% by weight to approximately 16% by weight of sodium bisulfate. Preferably these percentages are 75% by weight of anhydrous sodium sulfate and 15% by weight of sodium tetraborate pentahydrate, and 10% by weight of sodium bisulfate.

A method of making a eutectic composition for coolness storage is also provided by the invention. It includes the step of adding to water at ambient temperature sufficient quantities of dry particulate sodium sulfate and sodium tetraborate pentahydrate to produce a mixture consisting essentially of 3.3% to approximately 4.3% by weight of sodium sulfate and approximately 0.5% to approximately 1.5% by weight of sodium tetraborate decahydrate (the pentahydrate becomes decahydrate, or borax, when mixed with the water). During the addition of this dry particulate material to the water, the method of the invention provides that the water is to be stirred. The method also provides for the addition of a buffering acid to reduce alkalinity, preferably sodium bisulfate comprising approximately 0.3% to approximately 0.9% by weight of the solution.

The eutectic composition of the invention, produced by the method of the invention, has a very stable melting and freezing temperature of 28 degrees F. which is ideal for cooling storage. The heat of fusion of the composition is approximately 142 Btu's per pound which is substantially higher than that of the Telkes' prior art eutectic described above. The salt of the eutectic of the invention is entirely within the solubility range of water and consequently little of it precipitates during mixture, so that a gel or thixotropic agent is not required. Any limited amount which may precipitate during freezing is easily remixed and dissolved by the recommended stirring. The sodium tetraborate decahydrate serves as an excellent nucleating agent minimizing subcooling during initial freezing. The high percentage of water in the eutectic solution results in formation of ice crystals of a regular pattern, which due to the high thermal conductivity of ice as compared to water (about 4 to 1), provides higher thermal conductivity during both freezing and melting. This is of great importance in the overall efficiency and economy in a thermal storage ice bank.

The preferred addition of an acid to reduce alkalinity is important because a high pH solution causes carbon dioxide to be absorbed by the air and precipitate carbonates. With water hardness in the range of five to six grains per gallon (i.e. medium-hard) with a pH of 7.5 to 8.0 it is desirable to add approximately 0.3% to 0.9% by weight of sodium bisulfate as a buffering acid. Sodium bisulfate, or $NaHSO_4$, which is preferred to reduce alkalinity is sometimes referred to as sodium acid sulfate, sodium hydrogen sulfate or sodium pyrosulfate. Very little of it need be added and therefore its cost and shipping weight is minimal. Since it is mixed with sodium sulfate there are less possible combinations that could be formed between them to precipitate.

The present invention does not utilize sodium tetraborate decahydrate, commonly known as borax, as the nucleating agent. In the initial dry particulate form but rather sodium tetraborate pentahydrate, which turns to borax when mixed with water. Dry sodium tetraborate pentahydrate is cheaper, lighter and more stable than borax and does not cake up in shipment but remains in particulate granular form for easy pouring into the water in the tank.

DESCRIPTION OF PREFERRED EMBODIMENT

Figure 2:
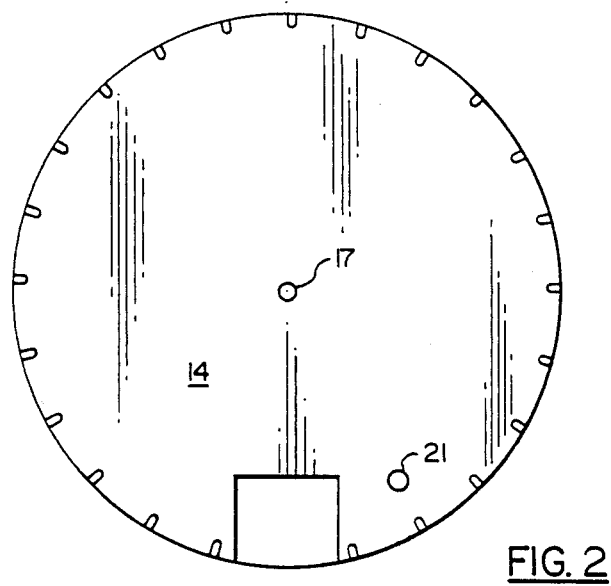
FIG. 2 is a top plan view of the tank of FIG. 1.

The ice bank shown in the drawings includes an outer skin of aluminum foil 10 covering thermal insulation 11 which in turn encloses a cylindrical tank 12 of rigid plastic such as polyethylene. An insulated base 13 defines the bottom of the tank and the top comprises a molded lid 14 with a foam insulation core. The tank 12 may be somewhat more than eight feet high and over seven feet in diameter. Coiled within it are extended lengths of plastic heat exchange tubing, perhaps of five-eights inch outside diameter, laid in a series of flat spirals with the turns in a given spiral and the spirals themselves held apart by spacer strips 15 as described in co-applicant Calvin MacCracken's U.S. Pat. No. 4,671,347. An anti-freeze heat transfer liquid such as ethylene glycol is circulated through the tubing to either melt or freeze a phase change material filling the tank up to a level indicated by the reference numeral 16.

Figure 1:
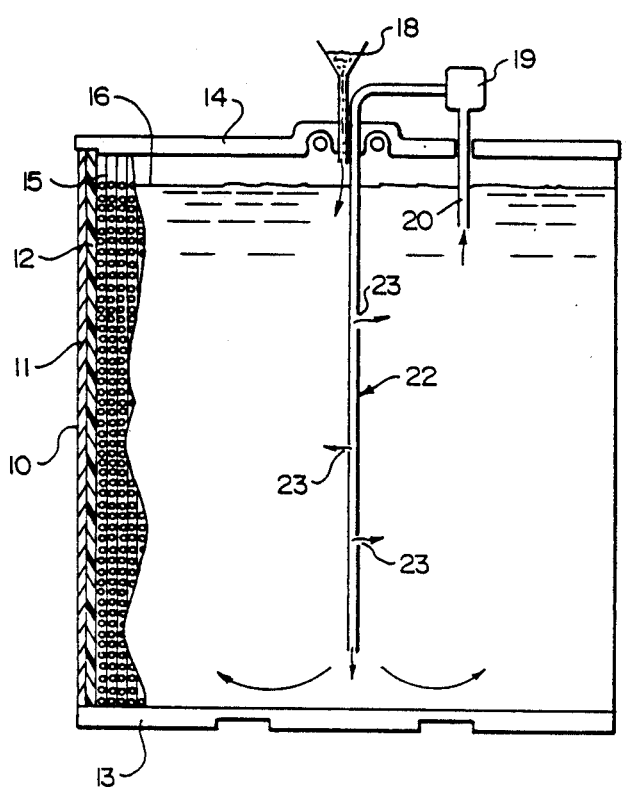
FIG. 1 is an elevation of a thermal storage device in which the eutectic of the invention and its method may be employed.

To charge the ice bank water is added through a central port 17 in the lid 14 to rise to the level indicated at 16 in FIG. 1 submerging all of the levels and spirals of the heat exchange tubing. With the use of a funnel 18 a dry particulate mixture as described below is added while the water is stirred. Closed circulation pumping achieves the stirring action during charging, as for example by a suction pump 19 temporarily used to draw water through an outlet pipe 20 from a second port 21 in the lid 14 and returning the water through the central fill port 17 by a fill pipe 22 extending almost to the bottom of the tank and equipped with outlet holes 23 at various levels.

EXAMPLE

The tank of an ice bank was filled to the level 16 with 1620 gallons or 13,328 pounds of water known to have a hardness of between 5 or 6 grains per gallon, which is medium-hard, and a pH of between 7.5 and 8.0. The pump 19 was then activated to circulate the water up through the pipe 20 and down through the pipe 22 so that a gentle stirring was achieved as the additives were introduced into the funnel 18. A dry particulate mixture was prepared of 75% by weight of anhydrous sodium sulfate or $Na_2SO_4$, 15% by weight of sodium tetraborate pentahydrate and 10% by weight of sodium bisulfate or $NaHSO_4$.

Approximately 710 pounds of this dry particulate mixture of sodium sulfate, sodium tetraborate pentahydrate and sodium bisulfate was slowly poured into the gently stirred water to produce a eutectic composition of 3.8% by weight of sodium sulfate, 0.1% by weight of sodium tetraborate decahydrate (the pentahydrate changed to decahydrate upon dissolution in the water) and 0.5% by weight of sodium bisulfate. This addition yields 1620 gallons or 14,038 pounds of eutectic solution with a liquid density of 1.04. Sodium tetraborate pentahydrate is preferred in the initial powdered form over decahydrate because, as noted previously, pentahydrate is less expensive, lighter in weight and does not cake up in shipment. Once the pentahydrate is in the water the ions gradually become the same as if it had been added in the form of decahydrate or borax. The sodium bisulfate acts as a buffering agent to lower the pH of the water to approximately 4.5.

This 28 degree F. eutectic of the invention is distinguishable over the prior art Telkes' 90 degree F. eutectic as follows:

|  | 90 Degree eutectic | 28 Degree eutectic |
| --- | --- | --- |
| Btu/lb. capacity | 80 | 142 |
| Btu/cu.ft.capacity | 7280 | 8500 |
| Density re water liquid/solid | 1.46/1.465 | 1.03/.96 |
| Expansion percent liquid/solid | <1% | 7.5 |
| Specific heat liquid/solid | .60/.40 | .85/.50 |
| Solubility | 85% | 99% to 100% |

It should be noted that water has a heat of fusion of 144 Btu/lb. and an expansion percentage of 9%. The cooling storage per unit volume of the eutectic of the invention is 8524 Btu/ft.$^3$ as compared to that of water which is 8177 Btu/ft.$^3$, an increase of 4.2%.

We claim:

1. A eutectic composition consisting essentially of approximately 3.3% to approximately 4.3% by weight of sodium sulfate, approximately 0.5% to approximately 1.0% by weight of sodium tetraborate decahydrate, and the balance water.

2. A eutectic composition according to claim 1 which also includes a buffering acid to reduce alkalinity.

3. A eutectic composition according to claim 2 wherein the buffering acid is sodium bisulfate and comprises approximately 0.4% to approximately 1.0% by weight of the composition.

4. A eutectic composition for coolness storage consisting essentially of approximately 3.8% by weight of sodium sulfate, approximately 1.% by weight of sodium tetraborate decahydrate dissolved in water, and approximately 0.3% to approximately 0.9% by weight of sodium bisulfate to reduce the alkalinity of the composition.

5. For addition to water to form a eutectic composition, a dry particulate mixture consisting essentially of approximately 65% to approximately 90% by weight of anhydrous sodium sulfate, approximately 10% to approximately 25% by weight of sodium tetraborate pentahydrate, and approximately 6% by weight to 16% by weight of sodium bisulfate.

6. For dissolution in water to form a eutectic composition, a dry particulate mixture consisting of approximately 75% by weight of anhydrous sodium sulfate, approximately 15% by weight of sodium tetraborate pentahydrate, and approximately 10% by weight of sodium bisulfate.

7. A method of making a eutectic composition for coolness storage which comprises
   (a) adding to water at ambient temperature sufficient quantities of dry particulate sodium sulfate and sodium tetraborate pentahydrate to produce a mixture consisting essentially of approximately 3.3% to approximately 4.3% by weight of sodium sulfate and approximately 0.5% to approximately 1.5% by weight of sodium tetraborate decahydrate and the balance water, and
   (b) stirring said water during the addition of the dry particulate material.

8. A method according to claim 7 which comprises the further step of adding to the water a buffering acid to reduce alkalinity.

9. A method according to claim 7 wherein the buffering acid is sodium bisulfate and comprises approximately 0.3% to approximately 0.9% by weight of the composition.

10. A method of making a eutectic composition for coolness storage which comprises
(a) adding to water at ambient temperature sufficient quantities of dry particulate mixture of anhydrous sodium sulfate and sodium tetraborate pentahydrate and sodium bisulfate to produce a solution consisting essentially of approximately 3.8% by weight of sodium sulfate and approximately 1.0% by weight of sodium tetraborate decahydrate and approximately 0.3% to approximately 0.9% by weight of sodium bisulfate and the balance water, and
(b) continuously stirring said water during the addition of the dry particulate materials.

* * * * *